United States Patent Office 3,033,597
Patented May 8, 1962

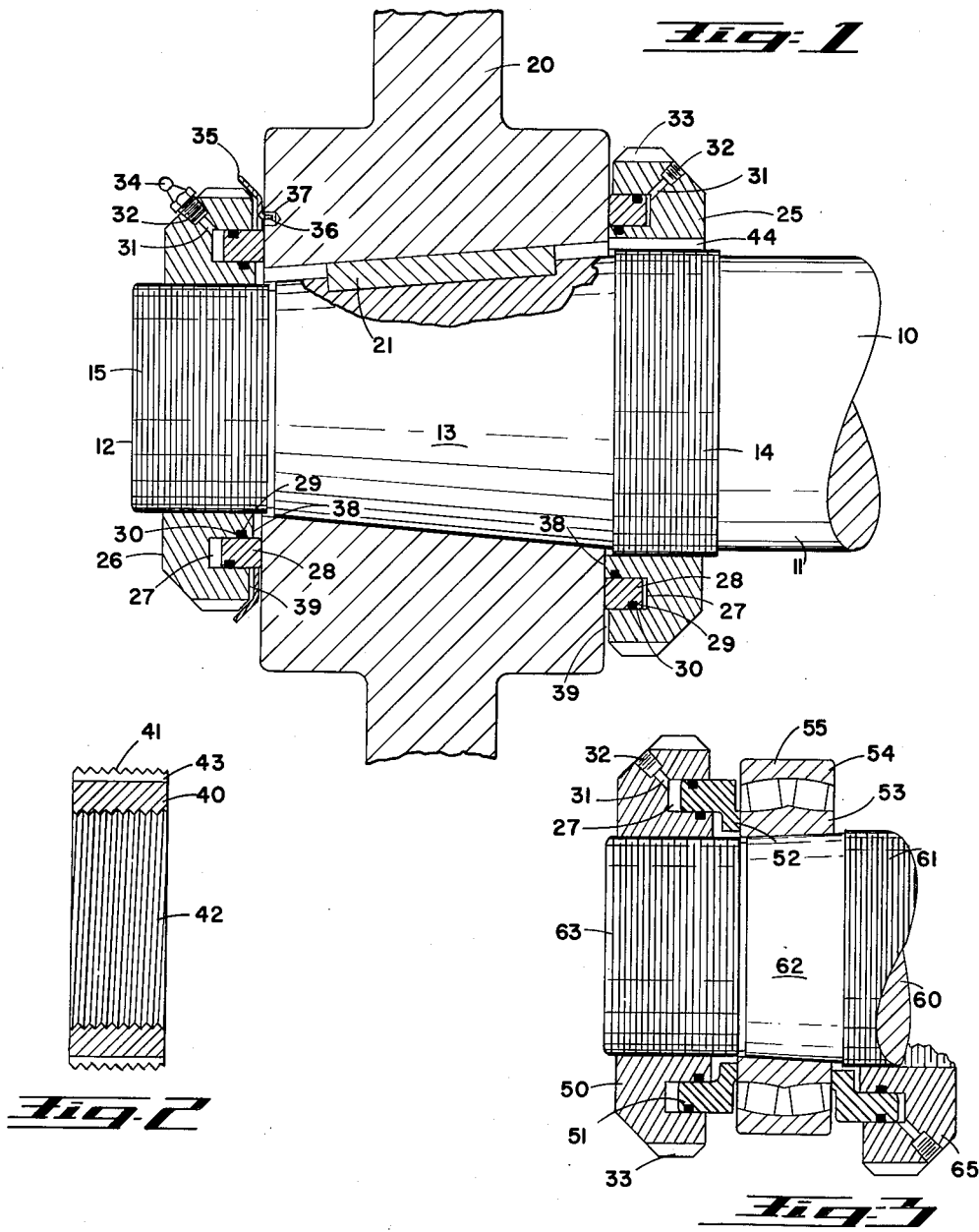

3,033,597
MEANS FOR MOUNTING AND DISMOUNTING GEARS AND THE LIKE ON SHAFTING
Frederick L. B. Miller, 1511 NE. 51st Ave., Portland 13, Oreg.
Filed Aug. 8, 1960, Ser. No. 48,252
4 Claims. (Cl. 287—53)

This invention relates to a device for mounting and dismounting a machinery part, such as a gear wheel, pulley, bearing, adapter sleeve and the like, with respect to a shaft, and has particular reference to a device which is adapted to remain on the shaft as a permanent part of the machinery to hold the part in its final position, as distinguished from other mounting and dismounting devices in the class of tools.

The invention is of general application but is of particular advantage in installations of heavy machinery in isolated places or any other situations where suitable press equipment is not available. It is also useful on small equipment to obviate the necessity for presses and conventional gear and wheel pullers and the like. It will, of course, be appreciated that mounting and dismounting devices in the class of tools are not adapted to serve as a permanent part of the machinery and may be required only infrequently whereby they may not be available when needed.

The general object of the present invention is, therefore, to provide a compact and simple arrangement of parts which can be utilized to force a machinery part onto or off a shaft.

Another object is to provide a device of the type described which is adapted further to hold the machinery part permanently in final position on the shaft.

Another object is to provide such a device with forcing means operable by hydraulic pressure developed by a conventional grease or oil pump.

The present device comprises a pair of nuts adapted to be threaded on a shaft on opposite sides of the part to be secured. Each nut carries an annular piston arranged to bear against the part. The piston is actuated by hydraulic pressure supplied by a conventional grease or oil pump which is always available for use in connection with maintenance of the machinery. The piston in one of the nuts is actuated to force the part into its final position on the shaft and the piston in the other nut operates in the opposite direction to force the part off the shaft. The nuts are merely tightened against the part to hold it in its final position on the shaft. Thus, the mounting and dismounting means is self-contained on the machinery and is always available for use when needed without requiring any special tools or equipment.

The foregoing and other objects and advantages will become apparent and the invention will be better understood from the following description of certain preferred embodiments illustrated on the accompanying drawing. Various changes may be made, however, in the construction and arrangement of parts and all such modifications within the scope of the appended claims are included in the invention.

In the drawing:

FIGURE 1 is a longitudinal sectional view showing one form of the present device for use with a gear wheel or pulley;

FIGURE 2 is a sectional view of an adapter which may be used in one of the nuts shown in FIGURE 1; and FIGURE 3 is a longitudinal sectional view of a modification adapted for use with bearings.

In FIGURE 1 the shaft 10 has a large diameter cylindrical portion 11 and a small diameter cylindrical end portion 12 at opposite ends of a tapered conical seating portion 13. The cylindrical portions are threaded at 14 and 15, and the tapered portion carries the gear wheel 20 which is secured against rotation by the key 21.

Mounted on the threaded portions 14 and 15 are nuts 25 and 26, each containing an annular channel 27 on the side facing the gear wheel. Mounted in each channel 27 is an annular piston 28 which is adapted to bear against the hub of the gear wheel. The pistons and nuts are equipped with annular grooves 29 containing rubber O-rings 30 to provide hydraulic pressure seals. Communicating with the bottom of each channel 27 is a passage 31 having a threaded end 32 on the back side of the nut to receive a grease or oil pressure fitting 34 or a threaded pipe from a grease or oil pump. No check valve is provided either in the passage 31 or in such fitting. Both nuts have notches 33 at spaced points around their periphery to fit a spanner wrench.

When the gear 20 is to be installed on the shaft, the nut 25 is first applied and screwed back to a point where it will clear the gear in its final position. The gear is then placed on the shaft followed by a lock washer 35 and the nut 26 which is tightened by a wrench as far as possible. Then hydraulic pressure is applied to the channel 27 in nut 26, causing the piston 28 to seat the tapered bore of the gear hub in its final position on the tapered portion 13 of the shaft. The source of hydraulic pressure is then removed and the nut 26 turned by a wrench to hold the gear permanently in its final position. Inwardly from channel 27 is an annular bearing shoulder 38 to clamp the gear, the piston 28 being retractable behind the plane of this shoulder. Outer shoulder 39 is relieved to accommodate the thickness of lock washer 35.

Loosening of the nut in service is prevented by the lock washer 35. The lock washer has radial tongues, one of which may be bent into one of the notches 33 of the nut. An inner tongue 36 on the washer is adapted to enter a small recess 37 in the gear wheel. In assembling the parts the tongue 36 is, of course, located in the recess 37 before the nut is tightened, and the radial tongue bent into notch 33 after the nut has been tightened. On a tapered shaft nut 25 has no function in holding the gear wheel but may be tightened against the gear wheel to prevent the nut from being loose on the shaft.

When the shaft has no taper, the nuts 25 and 26 both may then be equipped with lock washers or the like. In such case, one nut is used to locate the final position of the gear wheel, the gear wheel being pressed against said one nut by piston 28 of the other nut in assembly and then the other nut being tightened by hand and locked as described above.

In either case the gear is loosened for removal by merely first loosening the nut 26 and then applying hydraulic pressure to the channel 27 of nut 25, causing piston 28 of nut 25 to break the gear wheel loose and shift it to the left. The present arrangement is particularly effective on a tapered shaft because only a slight movement is necessary to break the gear wheel loose.

FIGURE 2 illustrates an adapter 40 which may be inserted in a large nut 25 to take the place of the small nut 26 in FIGURE 1. This adapter comprises simply a metal ring having external threads 41 to fit the internal threads in nut 25 and having internal threads 42 to fit the shaft threads 15. External keyways 43 are provided, and then the nut 25 must be similarly provided with one or more internal keyways 44 to receive a key for preventing relative rotation between the nut 25 and adapter 40. Such key may be equipped with suitable means to prevent its sliding out of place. Thus, when the adapter 40 is used, the nut 25 containing the adapter is applied to the threaded portion 15 of the shaft in place of nut 26, and another nut 25 without an adapter is applied to the threaded portion 14 as above described. The use of the adapter thereby standardizes the size of the nuts including pistons 28 and O-rings 30 to reduce the cost of manufacture. It also permits use of the same nut for both purposes if a tapered seat is provided or if a bearing shoulder is not required otherwise and provided nut 25 may be mounted from the right end of the shaft.

FIGURE 3 shows a modification especially adapted for pressing bearing units on or off a shaft. In this case, the jack nut 50 is similar to the nuts 25 and 26 except that its piston 51 has an offset end portion 52 adapted to bear against the inner race 53 of a roller bearing unit 54. In a similar manner, the outer end of piston 51 may be offset radially outward to bear against the outer race 55 when desired. The shaft 60 in this case has a large diameter threaded portion 61, a tapered portion 62 to seat the correspondingly tapered inner race 53, and a threaded small diameter end portion 63. The nut 50 may, of course, also be used with a shaft and bearing unit without a taper. Nut 65 is similar to nut 50 except that it is threaded to fit threaded shaft portion 61.

When the shaft seat has no taper, the two nuts may be identical if they can be mounted from opposite ends of the shaft. When mounting from one end is required, one nut must have a larger bore and thread than the other and this situation can occur with either a tapered or cylindrical seat. In all such cases, the adapter 40 may be used to advantage.

Having now described my invention and in what manner the same may be used, what I claim as new and desire to protect by Letters Patent is:

1. Means for mounting and dismounting gears and the like on a seating portion of a shaft between a large diameter threaded portion and a small diameter threaded portion comprising a pair of identical jack nuts each internally threaded to fit said large diameter threaded portion of the shaft, an annular piston in each nut extendable axially from an annular channel in one face of the nut by hydraulic pressure applied to said channel under said piston, an adapter ring having external threads to fit the internal threads in said nuts and having internal threads to fit the small diameter threaded portion of said shaft, and means for applying hydraulic pressure to said channels.

2. A shaft having a seating portion for a wheel, a wheel having a hub on said seating portion, screw threads on said shaft on opposite sides of said seating portion, a pair of nuts on said threads, annular channels in said nuts coaxial with said shaft, annular pistons movable in said channels to bear against opposite sides of said wheel hub, and passageways in said nuts arranged to transmit hydraulic pressure to the bottom of said channels to press said pistons against the wheel hub.

3. A shaft having a seating portion for a wheel, a wheel having a hub on said seating portion, a pair of nuts on said shaft adapted to be clamped against opposite sides of said wheel hub, an annular piston in the face of one nut confronting one face of said hub and movable axially to press said wheel into seating position when the other nut is backed away from the wheel, and an annular piston in the face of said other nut confronting the opposite face of said hub and movable axially to press said wheel out of seating position when said one nut is backed away from the wheel.

4. A shaft having a seating portion for an annular member mounted on the shaft, screw threads on said shaft on opposite sides of said seating portion, a pair of nuts on said screw threads on opposite sides of said member, annular channels concentric with said shaft in the faces of said nuts which confront said member, means for applying hydraulic pressure to said channels, and annular pistons in said channels arranged for axial movement to bear against opposite sides of said member.

References Cited in the file of this patent

UNITED STATES PATENTS

| 1,959,901 | Buehle | May 22, 1934 |
| 2,812,684 | Schrem | Nov. 12, 1957 |

FOREIGN PATENTS

| 350,893 | Germany | Mar. 28, 1922 |
| 882,892 | France | Mar. 8, 1943 |